United States Patent [19]
Krupp

[11] Patent Number: 5,161,573
[45] Date of Patent: Nov. 10, 1992

[54] PRESSURE EQUALIZING DAMPER

[76] Inventor: David Krupp, 2803 Mimi Ave., Chester, Va. 23831

[21] Appl. No.: 695,957

[22] Filed: May 6, 1991

[51] Int. Cl.⁵ ............................................. F16K 17/04
[52] U.S. Cl. ................................. 137/526; 137/529; 137/537
[58] Field of Search ...................... 137/526, 529, 537

[56] References Cited

U.S. PATENT DOCUMENTS

| | | | |
|---|---|---|---|
| 2,452,612 | 11/1948 | Swenberg | 137/526 X |
| 4,017,026 | 4/1977 | Felter | |
| 4,140,151 | 2/1979 | Van Becelaere | 137/526 |
| 4,181,119 | 1/1980 | Lyles | |
| 4,184,509 | 1/1980 | Kasper | 137/526 |
| 4,262,652 | 4/1981 | Butzen | |
| 4,290,552 | 9/1981 | Prikkel | |
| 4,449,512 | 5/1984 | Hebert | |

Primary Examiner—Robert G. Nilson
Attorney, Agent, or Firm—Norman B. Rainer

[57] ABSTRACT

A self-adjusting damper device is provided for installation into an air-conveying duct to prevent the development of damaging low pressure within the duct. The device utilizes a panel adapted to occlude an aperture in the duct. Springs hold the panel in a position which normally occludes the aperture. The panel travels toward the interior of the duct in response to low pressure within the duct. The extent of travel of the panel is limited by a retaining member.

1 Claim, 4 Drawing Sheets

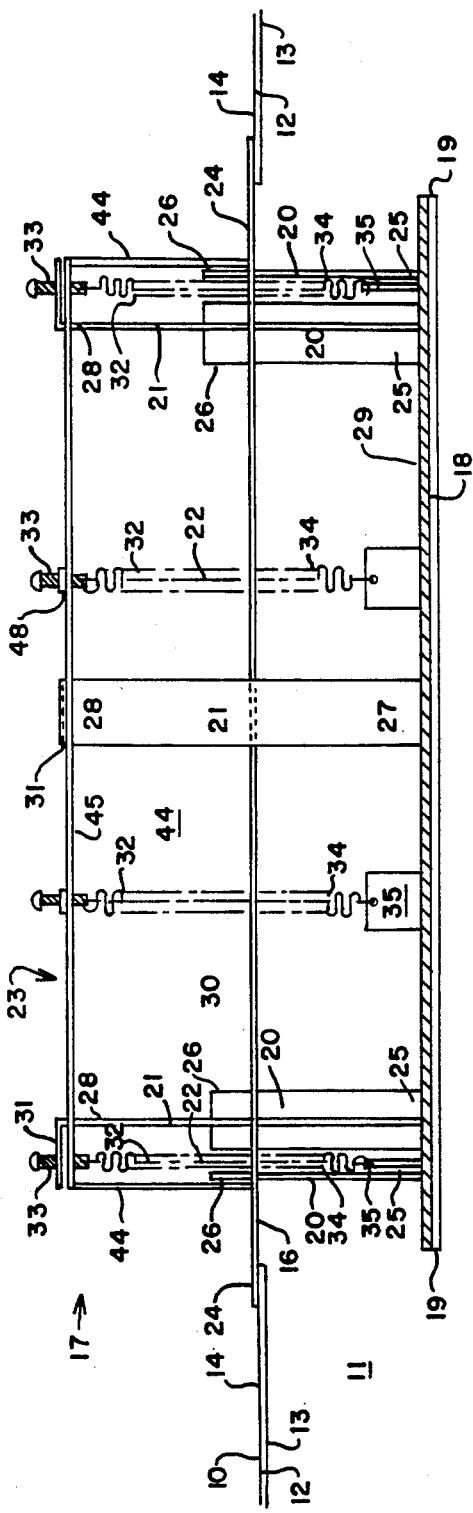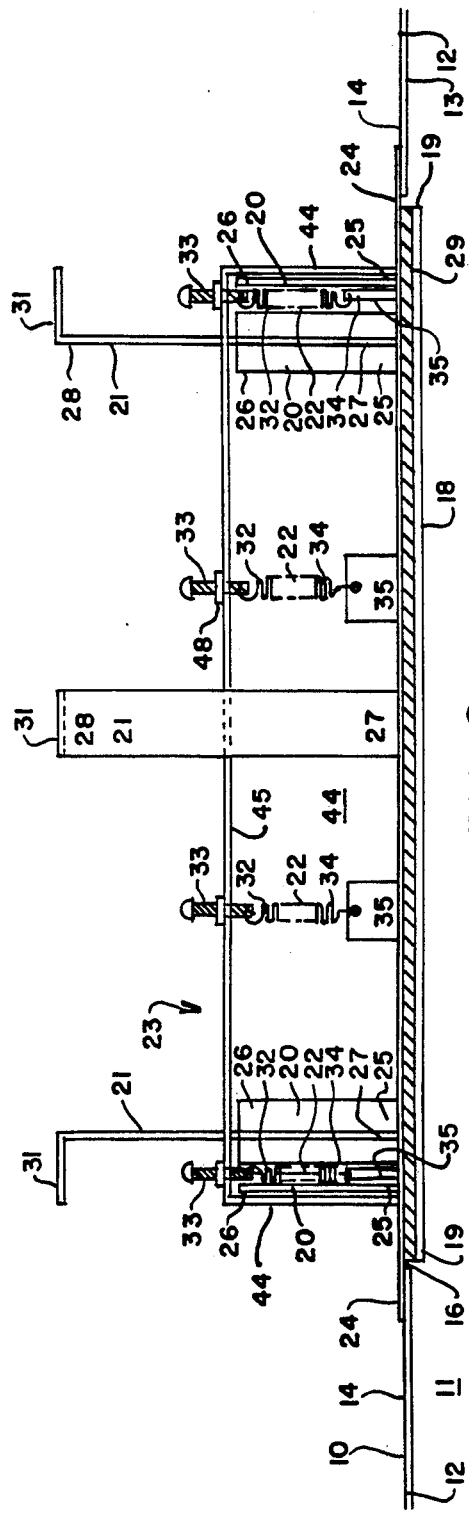

PRESSURE EQUALIZING DAMPER

BACKGROUND OF THE INVENTION

1. Field of the Invention

This invention relates to ventilation ductwork used in air conditioning and heating systems, and more particularly concerns an automatically adjusting damper device adapted to equalize internal and external air pressures upon initiation of air movement within the ductwork.

2. Description of the Prior Art

In air conditioning and heating systems, air is generally blown through a ventilator duct from the air conditioner or furnace, and is pulled back through return ducts. Upon initial activation of the blower fan, a positive pressure is generated within the ventilator ducts and a vacuum is pulled in the return ducts. Subsequent to a brief period of start-up of the blower, the pressure inside the return duct equalizes with the ambient pressure outside. Due to the large volumes of air moved by the blowers in large systems, the vacuum generated may be sufficient to cause deformation or implosion of return ducts. Such damage is costly to repair in terms of materials and manpower and once repair has been made, the damage is likely to recur. It is therefore desirable to provide means in existing ductwork to alleviate the damaging effects of internal vacuum.

Various damper devices have earlier been disclosed for use in ductwork. However, such devices are usually designed to open or close duct passages either manually or through some mechanical or electromechanical means. Damper devices of this nature may be used to divert air to various locations within a structure or simply to close-off a passageway when the blower is deactivated. U.S. Pat. No. 4,262,652, for example is intended to close off air passage from a furance when the furnace is not activated. The damper is mounted within the duct and in the form of a butterfly valve. It has a spring loaded open position and is driven closed by an electric motor. This and other similar devices require electrical connection, utilize a number of moving parts, restrict airflow within the duct and are difficult to install.

U.S. Pat. Nos. 4,290,552 and 4,017,028 disclose similar dampers driven to open and closed positions by means of thermostatic control units, springs and convoluted bimetalic coils. These devices require periodic temperature adjustment in usage and could only be used for one of heating or air conditioning applications concurrently. Moreover, none of these devices are designed to equalize internal and external pressures of the duct.

It is therefore a primary object of the present invention to provide a self adjusting damper device to equalize momentary pressure differences occurring between the interior and exterior of heating/air conditioning ductwork upon start-up of the associated blower fan.

It is another object of the present invention to provide a damper device of the aforesaid nature which may be easily installed in various orientations in existing ductwork without restricting airflow within the ductwork.

It is yet another object of the present invention to provide a damper device of the aforesaid nature which has minimal moving parts, is self-contained, and requires no outside electrical, mechanical or pneumatic activation mechanism.

It is still another object of the present invention to provide a damper device of the aforesaid nature which is of durable construction and amenable to low cost manufacture.

SUMMARY OF THE INVENTION

The above and other beneficial objects and advantages are accomplished in accordance with the present invention by a self-adjusting spring damper device adapted to operably associate with an air conditioning or heating return duct associated with the suction end of a blower, said return duct having an interior region bounded in part by four elongated side walls disposed in a manner forming a substantially rectangular cross section, each of said walls having interior and exerior surfaces, one of said walls having a mounting aperture communicating between said surfaces, said damper comprised of:

a) a panel having a perimeter adapted to contact said interior surface in overlying abutment with said aperture, said panel adapted to travel inwardly when acted upon by vacuum created within said return duct upon start-up of said blower, b) positioning means adapted to maintain said perimeter in overlying juxtaposition with said aperture, c) retaining means associated with said panel and said wall and adapted to define a limit to the motion of said panel, and d) at least one return spring means adapted to cause said panel to normally occlude said aperture, while permitting inward travel of said panel upon start-up of said blower.

In a preferred embodiment, the device may have a housing having a rim adapted to be affixed to the exterior wall of the duct overlying the aperture in the duct wall. The housing has an opening adapted to permit airflow to the interior region, and may have a multiplicity of positioning means adapted to undergo reciprocal motion with respect to the duct in close conformity with the housing. The housing may also have a multiplicity of retaining means adapted to define a limit to the inward travel of the panel. A multiplicity of adjustable springs may be used to return the panel to its occlusion of the aperture in the duct wall. Compliant gasket material may be used to improve the seal between the perimeter of the panel and the duct.

In an alternative embodiment, the panel may have a proximal extremity hingedly associated with the duct wall, and an inwardly pivoting distal extremity having a coil spring that attaches to the duct wall. In such embodiments, the hinge functions both as retaining means and positioning means.

BRIEF DESCRIPTION OF THE DRAWING

For a fuller understanding of the nature and objects of the invention, reference should be had to the following detailed description taken in connection with accompanying drawing forming a part of this specification and in which similar numerals of reference indicate corresponding parts in all the figures of the drawing:

FIG. 2 is a side view of the embodiment of FIG. 1 in its the closed position.

FIG. 3 is a sectional side view of the embodiment of FIG. 1 in its open position.

DESCRIPTION OF THE PREFERRED EMBODIMENT

Figure 1:
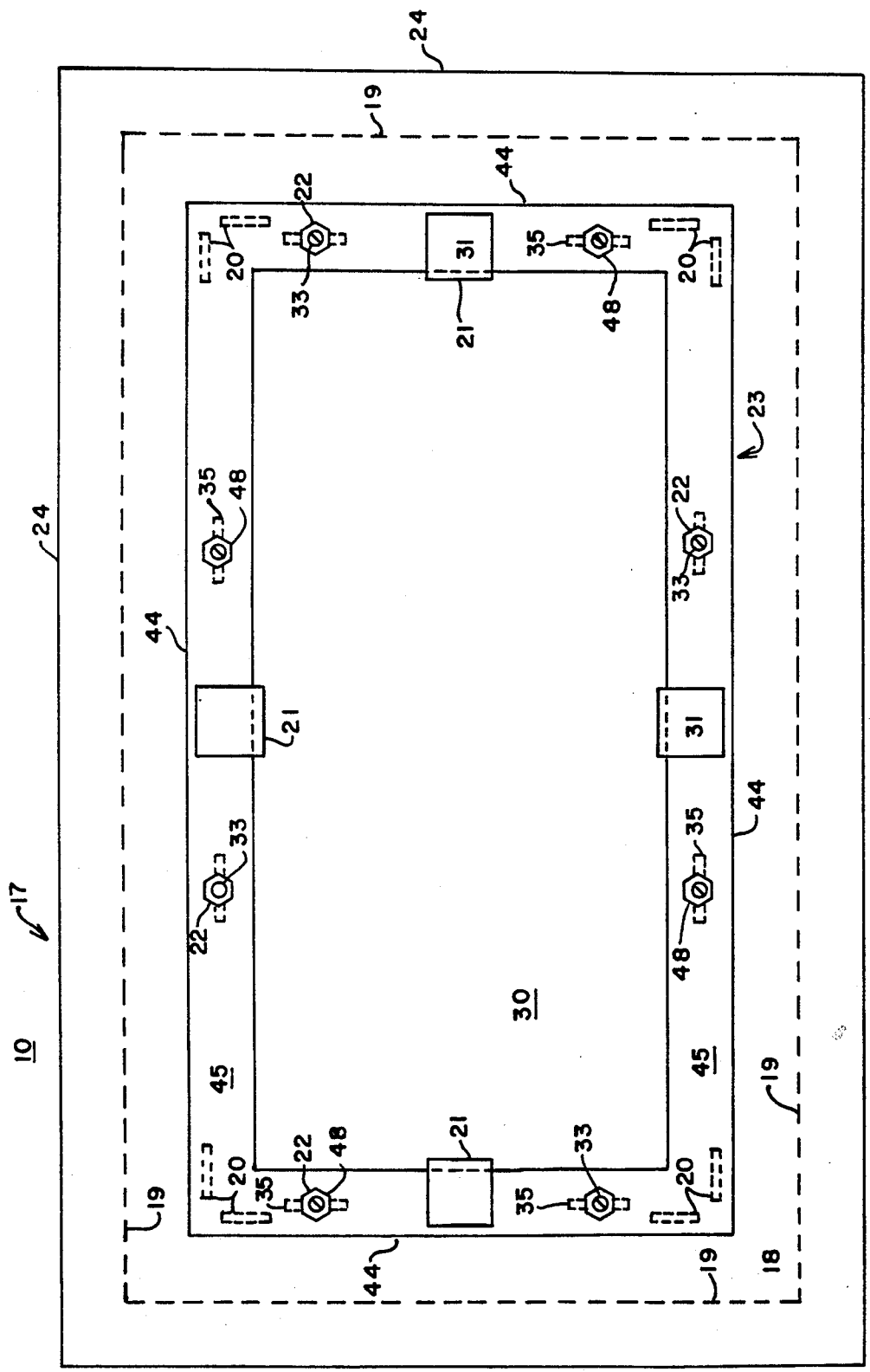
FIG. 1 is a top view of an embodiment of the self-adjusting damper device of the present invention.

Referring to FIGS. 1-4, a preferred and first alternative embodiment of the self-adjusting damper device 17 of the present invention are shown in operable association with air conditioning/heating return duct 10 leading from the suction end of a blower. Return duct 10 has interior region 11 bounded by four elongated side walls 12 disposed in a manner forming a conventionally-shaped conduit of substantially rectangular cross section. Each wall 12 has interior and exterior surfaces, 13 and 14, respectively. A mounting aperture 16 communicates between said interior and exterior surfaces.

The damper device 17 of this invention is comprised of housing 23 having substantially boxlike configuration, comprised of four rectangularly disposed sidewalls 44 having upper extremities provided with inwardly directed rectangular shoulder 45, and lower extremities associated with outwardly directed flat rim 24. Said rim 24 is adapted to be affixed to the exterior surface 14 of wall 12 in a manner to surround aperture 16. The interior opening 30 of the housing permits airflow to interior region 11.

Associated with the interiorly directed extremity of housing 23 is closure panel 18 having rectangular perimeter 19 adapted to contact rim 24, thereby sealing the housing opening 30. A flat neoprene rubber gasket 29 may be interposed between panel 18 and rim 24 to ensure air-tight contact. Panel 18 is adapted to travel inwardly when acted upon by vacuum created within interior region 11 upon the start-up of the blower. The expression "vacuum", as used herein denotes a situation wherein the pressure within the duct is less than the pressure of the ambient air that surrounds the duct.

Positioning means in the form of posts 20 are perpendicularly emergent from panel 18 adjacent the corners of perimeter 19. Said posts slidably engage the interior faces of sidewalls 44, and thereby maintain perimeter 19 in overlying juxtaposition with opening 30. Elongated retaining means 21 have lower extremities 27 fixedly associated with panel 18 and upper extremities 28 which extend through opening 30 and have stop means 31 adapted to engage shoulder 45 to define a lower limit to the motion of panel 18. Coil springs 22 have upper extremities 32 associated with shoulder 45 by means of threaded bolts 33 whose heights above shoulder 45 are controlled by threaded abutment nut 48. Lower extremities 34 of springs 22 are associated with panel 18 by means of spot welded sheet metal tabs 35. Springs 22 are adapted to cause panel 18 to normally occlude opening 30. Inward travel of panel 18 is permitted upon start-up of said blower activation, thereby allowing ambient air to enter duct 10 until substantial pressure equalization occurs. Upon equalization, the panel is automatically returned to its normally occlusive position.

Figure 4:
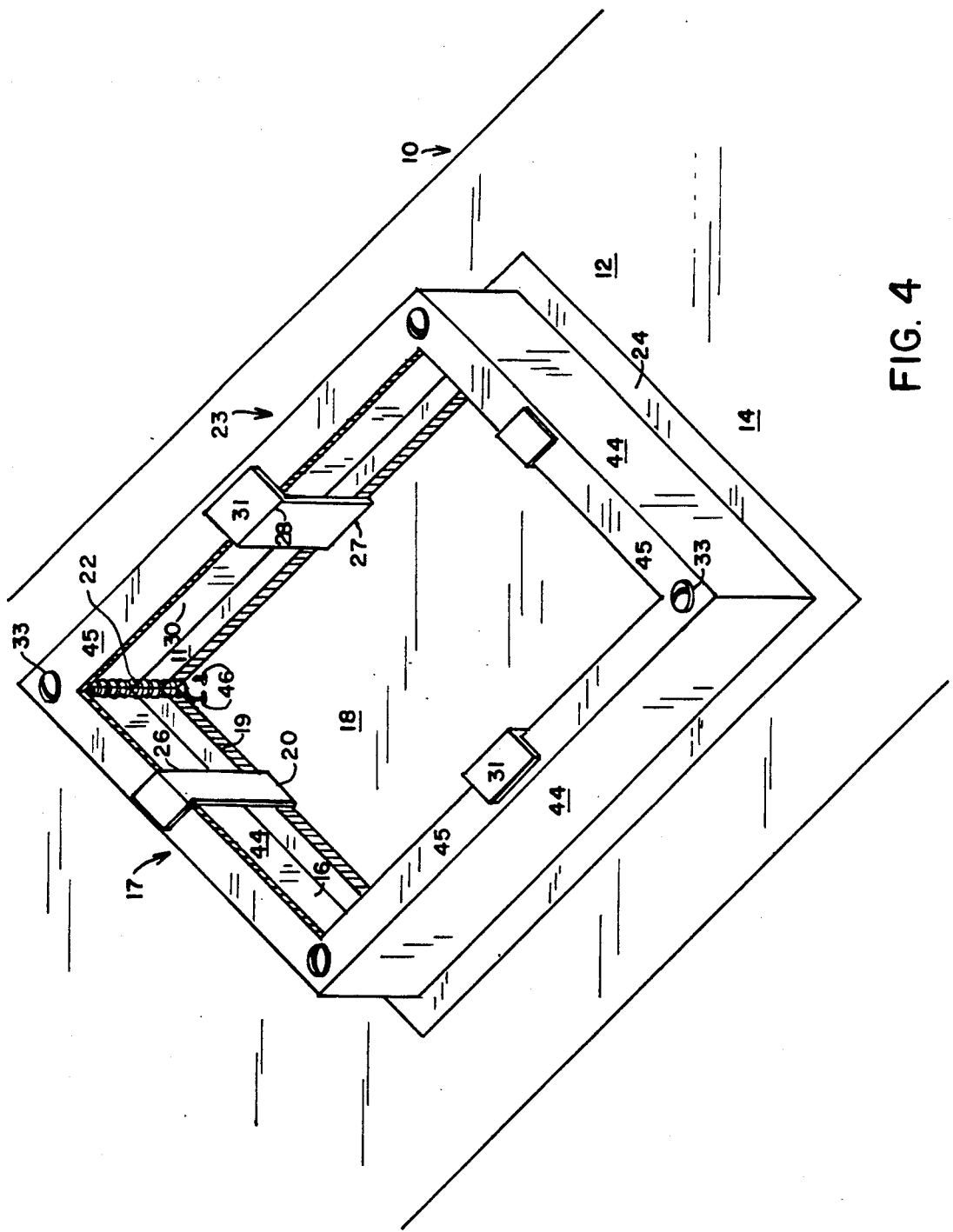
FIG. 4 is a top perspective view of a first alternative embodiment similar to that of FIG. 3.
Figure 5:
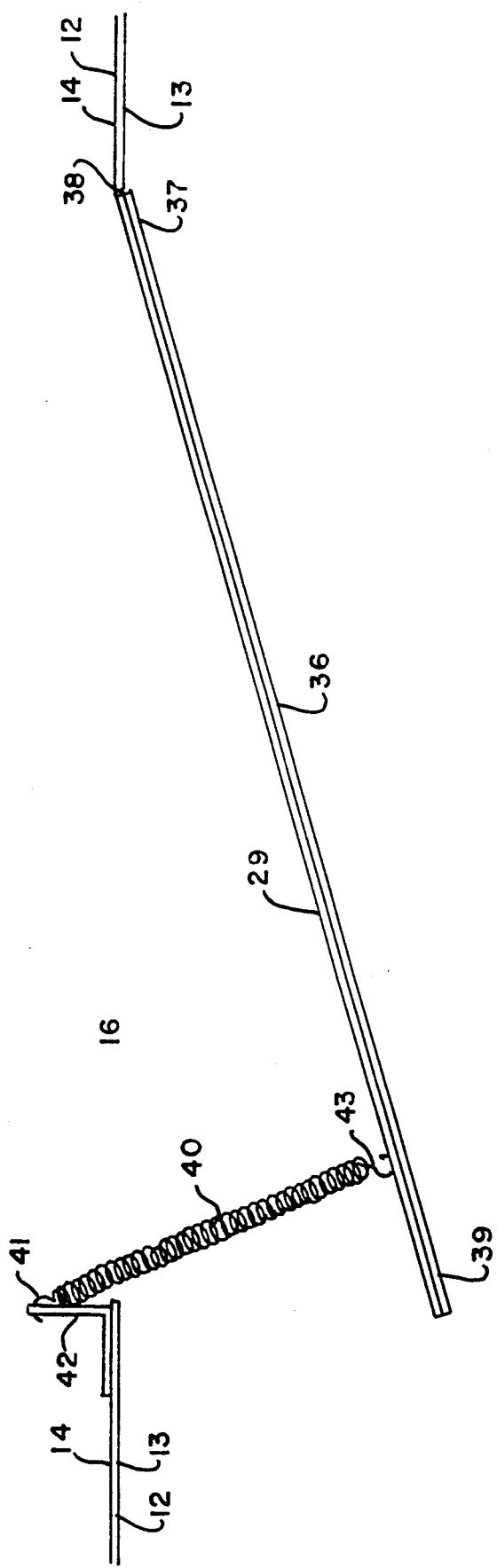
FIG. 5 is side view of a second alternative embodiment of the self-adjusting damper device of the present invention.

In the first alternative embodiment of FIG. 4, the positioning means and retaining means are functionally combined and tabs 35 have been replaced with paired holes 46 which anchor the lower extremity of each spring 22 in panel 18. In the second alternative embodiment of FIG. 5, panel 36 has proximal extremity 37 pivotably associated by means of hinge 38 with interior surface 13 of duct wall 12, and inwardly pivoting distal extremity 39. Return spring 40 has a first extremity 41 held by brace 42 fixedly associated with exterior surface 14 of duct wall 12. The second extremity 43 of spring 40 is attached to panel 36 adjacent distal extremity 39. In this embodiment, hinge 38 functions both as retaining means and positioning means.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A self-adjusting damper device adapted to be functionally emplaced over an aperture in a wall of an air-conveying duct having an interior region, said damper comprised of:
    a) a flat panel disposed within said interior region adjacent said wall, having a rectangular perimeter configured to occlude said aperture, and adapted to travel further into said interior region when the pressure within said interior region is less than the pressure of the ambient air surrounding saie duct,
    b) a housing of substantially box-like configuration comprised of four rectangularly disposed sidewalls having upper extremities provided with an inwardly directed shoulder, and lower extremities having an outwardly directed flat rim adapted to be affixed to said duct in a manner to surround said aperture,
    c) positioning means perpendicularly emergent from said panel in sliding engagement with said inwardly directed shoulder and adapted to maintain said perimeter in overlying juxtaposition with said aperture,
    d) stop means associated with said positioning means and adapted to engage said inwardly directed shoulder to limit the travel of said panel, and
    e) coil springs having lower extremities associated with said panel and upper extremities adjustably associated with said inwardly directed shoulder by way of threaded bolts, said springs adapted to cause said panel to normally occlude said aperture while permitting said travel of said panel.

* * * * *